Sept. 10, 1968   R. V. HOLDEN   3,401,239
REPAIRABLE TROLLEY CONSTRUCTION
Filed July 27, 1966
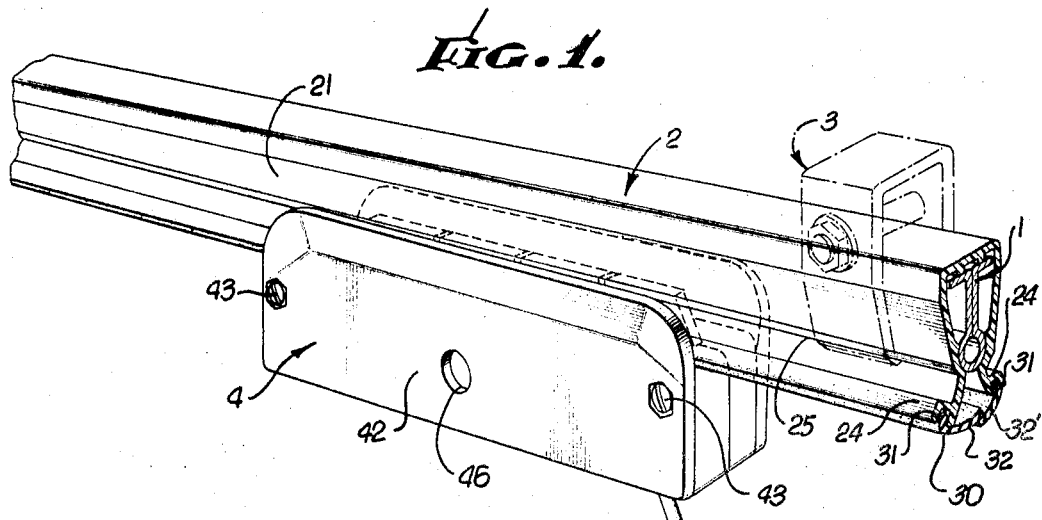
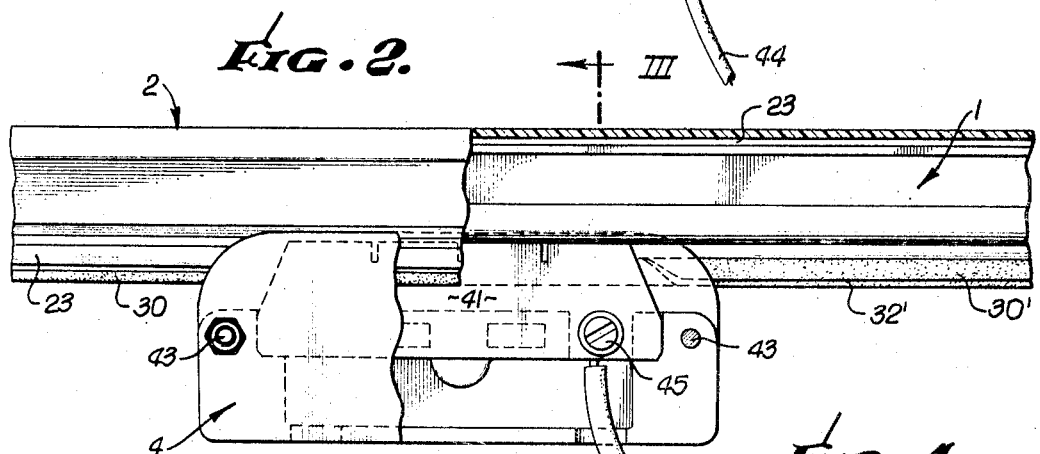
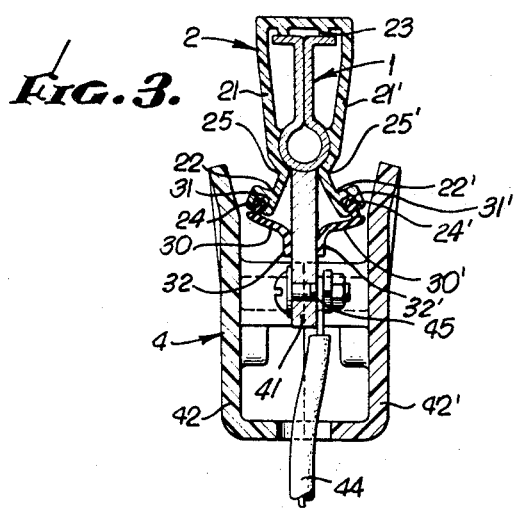
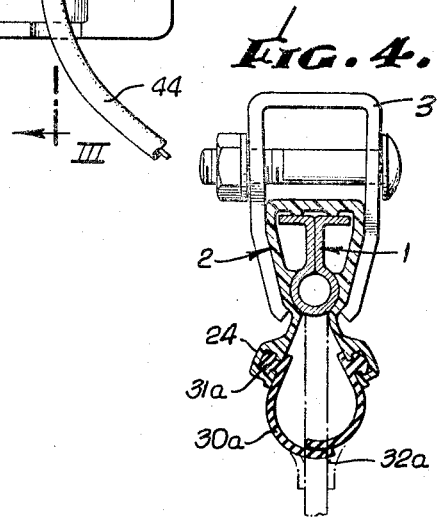
Roy V. Holden
INVENTOR.
By Miketta, Glenny, Poms & Smith
ATTORNEYS.

United States Patent Office 3,401,239
Patented Sept. 10, 1968

3,401,239
REPAIRABLE TROLLEY CONSTRUCTION
Roy V. Holden, Long Beach, Calif., assignor to Duct-O-Wire Company, Long Beach., Calif., a corporation of California
Filed July 27, 1966, Ser. No. 568,213
4 Claims. (Cl. 191—31)

ABSTRACT OF THE DISCLOSURE

An overhead trolley system including a longitudinally extending inverted, generally U-shaped housing for enclosing a conductor bar and including depending arms for receiving a moveable collector shoe, each of the housing arms supporting a longitudinally extending removeable flexible and resilient sealing strip, the free edge portions of which are in sealing contact so as to cover the opening of the housing.

---

The present invention relates to overhead trolley systems and is particularly directed to a trolley (including a bus bar conductor in a housing) which may be readily attached to any support, which is completely enclosed and which can be readily repaired without the necessity of dismantling the trolley.

In many industrial manufacturing plants, chemical plants, ceramic plants, etc., it is desired to use electrified systems for supplying current to hoists, cranes and other movable units requiring power. In all of these systems, there is a stationary conductor bar permanently connected to a source of electrical energy; a movable collector shoe slidably contacts an exposed portion of the conductor bar, said shoe being then connected to whatever motor means are to be supplied with the current. The collector shoe may be attached to an operator's cage or it may be provided with wheels or rollers riding along a track in close proximity to the conductor bar. Since in these industrial plants the conductor bar may be subjected to acid fumes, salt, dust, weather and other conditions which may deleteriously affect the conductor and its ability to make proper contact with the collector shoe, attempts have been made to protect the conductor bar from these adverse influences. Moreover, it is highly desirable that the conductor bar be protected to prevent or preclude accidental contact therewith.

In some prior installations, attempts have been made to cover the conductor bar with a resilient, rubber-like insulating shield as, for example, in Patent 2,668,199. However, these shields deteriorate and in the event it is desired to repair such a shield or replace it, it is necessary to dismantle the entire trolley system. The present invention is particularly directed to the provision of an improved arrangement whereby the conductor is properly shielded and such shielding is capable of being removed and replaced without dismantling of the trolley system. Moreover, the present invention is directed to a system wherein the entire attachment and installation of the system is greatly facilitated.

Generally stated, the invention provides an insulating preformed, virtually rigid, but slightly resilient housing adapted to firmly hold a contained conductor bar, the housing being provided with means for removably receiving and positioning sealing strips which close the opening through which a movable collector shoe may come into sliding contact with the conductor bar. Moreover, the housing is so arranged that it may be readily associated with clamping means for holding the housing and its contained conductor bar in any desired position, whereby the housing in the entire trolley system may be attached to an overhead beam, a vertical surface of a wall or wherever it is desired to lead such a trolley system.

An object of the present invention therefore is to disclose and provide an overhead trolley system which is safe, versatile, efficient, economical, adequately protects the conductor bar and contacting shoe from the effect of adverse ambient atmospheric conditions, and is capable of being readily installed and repaired.

A still further object is to disclose and provide a conductor system for electrified rails which employs a minimum number of separate parts or elements, employs resilient strips of material covering and protecting the conductor bar from adverse atmospheric conditions, and is capable of being readily repaired without dismantling of the system.

These and various other advantages of the present invention will become apparent from the following description, reference being had to the appended drawings which illustrate exemplary embodiments of the present invention.

In the drawings:

FIG. 1 is a perspective view of a portion of an overhead trolley system showing the housing with its contained conductor bar, the sealing means, and an exemplary movable collector shoe;

FIG. 2 is a side elevation partly broken away illustrating the relationship between the elements;

FIG. 3 is a vertical section taken along the plane III—III in FIG. 2;

FIG. 4 is a transverse section through a modified form of housing and sealing strip retaining means.

In the appended drawings, the conductor bar is generally indicated at 1 and in the form shown, is made of suitable conducting metal, is T-shaped, the leg terminating in an enlarged head adapted to provide a suitable surface for contact with an electrically conducting shoe element contained within the movable collector shoe 4. The conductor bar 1 is held within a preformed, preferably extruded, housing 2 made of a suitable insulating composition. The conductor bar and its housing 2 are preferably attached as by means of clamps such as are shown in dash lines at 3 to a suitable stationary support.

The insulating housing 2 is preferably of inverted U-section (as most clearly shown in FIG. 3) having downwardly extending arms 21–21', the arms having lower sections which flare outwardly, as indicated at 22. The inner surface of the housing is suitably contoured so as to provide a recess which grasps and positions the enlarged head of the conductor bar 1. It has also been found desirable to form inwardly extending ribs, such as 23, in the inner surface of the base or top portion of the housing so as to contact the flanges of the T-shaped conductor bar at spaced lines only, precluding contact of the conductor with a very large surface of the housing. Although the housing is virtually rigid, it is sufficiently resilient so as to permit the T-bar to be slipped into the housing, the arms 21 of the housing firmly contacting and grasping the head of the conductor bar.

The outwardly flaring lower sections 22–22' of the housing provide an opening therebetween for the reception of a contact shoe 41 carried within the movable collector shoe housing 4. In accordance with the present invention, there is an outward enlargement along the lower edge portion of each of the sections 22 and 22', such enlarged sections being indicated at 24 and 24'. These enlarged portions 24 and 24' perform a dual function in that each enlargement cooperates with the upper section or arm of the housing to form a groove or recess 25, 25' extending longitudinally of the housing for the reception of the lower ends of clamping means such as are shown in dash lines at 3 in FIG. 1. As a result, the housing may be connected to suitable supports at any desired portion of its length by clamping means without the necessity of drilling holes in the housing or insuring predetermined locations for such clamping means. In addition, each of the enlargements 24 provides a downwardly and sidewardly facing channel which extends longitudinally of the lower edge portion, the longitudinal margins of such channel being preferably provided with somewhat inwardly turned lips, each such channel now being capable of receiving one longitudinal edge of a resilient, flexible sealing strip 30. That edge of the sealing strip 30 which is inserted into the channel is preferably slightly enlarged or provided with a bead along such edge so that after the strip is slid into the channel, it is retained therein. Each strip 30 may be preformed with a slightly curved cross-section during molding so that the free edges 32 of opposing strips so held by the housing are in overlapping relation normally as best shown in FIG. 1. By the use of the construction shown, it will be evident that the cooperative effect of the two resilient sealing strips 30–30' protects the connector bar retained within the housing 2 from the effect of fumes, gases, weather, dusts, and other adverse ambient conditions.

As best shown in FIGS. 2 and 3, the movable collector shoe may comprise two mating shell portions 42 and 42' held together by any suitable means such as the bolts 43. These shell elements are made of insulating material and include a recess adapted to positively hold the medially disposed, outwardly extending metallic shoe 41. The sides of the movable collector shoe extend upwardly beyond the lower margins of the arms of the housing and the end portions of such sides may be slightly flared outwardly as indicated in FIG. 3 so as to facilitate sliding movement of the collector shoe along the bottom of the overhead trolley system. The bottom of the shoe is preferably provided with a port to which a conductor wire 44 may extend and be connected to the shoe 41 at a terminal post 45. The sides of the collector shoe may be provided with opposed recesses indicated at 46 to facilitate attachment of the shoe to a crane control cage, a movable motor mount, or other unit capable of traveling along the trolley system.

As shown in FIG. 1, the interior of the housing is completely enclosed by the housing and the flexible sealing strips 30, but since the sealing strips have free edges 32, they are readily progressively displaced downwardly when the shoe 41 moves along the trolley system and into the position indicated in FIG. 3. It will be noted that even when they are displaced by the traveling shoe, the contact area between the shoe and the conductor bar 1 is still protected from the entry of dust, fumes or the like. As soon as the movable collector shoe moves past a given point, the flexible free ends of the sealing strips return to the position indicated in FIG. 1 and again assume their normal overlapping sealed relationship.

Moreover, in the event the resilient strips become damaged from constant use, they may be readily removed and new strips inserted without dismantling the entire trolley system. It will be noted that the clamping means 3 do not interfere with the removal of the strips 30 since the clamping strips terminate in the grooves 25, 25' in a zone above the channels formed in the enlarged lower edge portions of the outwardly inclined lower sections of the arms. Strips 30 may be inserted either from the end of the entire trolley system and simply pulled along their respective interlocking grooves or the resilient bead-like heads provided along one edge of each strip may be forced into the channels.

The modified form of the present invention illustrated in FIG. 4 differs from the form illustrated in previous figures in that the channels do not face downwardly and outwardly but, instead, are formed with their openings along the internal surface of the housing opposite the enlargements 24 formed along the lower edge portion of each outwardly inclined lower arm section. Moreover, the resilient flexible insulating sealing strips 30 (now identified by the suffix $a$) are each provided with a button-like bead 31a which extends into the channels and a free edge 32a, the preformed transverse section of these longitudinally extending sealing strips being such as to provide a rounded outer surface when the two strips are in cooperative, undistorted position shown in FIG. 4. Again however, when the movable collector shoe slides along the trolley, these two sealing strips are readily deformed and contact the shoe while permitting it to maintain contact with the conductor bar 1.

It should be noted that the housing is substantially rigid and provides support for the conductor 1 between clamps 3. The sealing strips are relatively flexible and as they are deformed by passage of the shoe, any loose foreign matter which might have collected on the internal surfaces of strip are dislodged and fall through the openings formed by the expanding and closing strips in front of and in back of the shoe. In this sense, a self-cleaning construction is afforded. In addition, the slight curvature of the strips provides a drainage path in the event moisture collects within the housing.

It will also be apparent that the above construction is readily adapted for outdoor or indoor installations, that the sealing strips protect against weather conditions and may be readily removed in part or in whole for repair and maintenance.

The various advantages obtained by the present construction will become readily apparent to those skilled in the art. All changes and modifications coming within the scope of the appended claims are embraced thereby.

I claim:

1. In an overhead trolley system including a longitudinally extending housing of inverted, generally U-shaped form, arms of said housing being adapted to enclose a conductor bar, lower sections of the arms of said housing being oppositely and outwardly inclined to provide an opening therebetween for the reception of a moveable collector shoe, the provision of:
   means carried by each of said lower arm sections for removeably receiving and positioning a sealing strip;
   and a flexible and resilient sealing strip having one longitudinal edge portion in engagement with said means and extending inwardly therefrom and a free edge portion in sealing contact with the free edge portion of the other strip, to cover the opening of said housing.

2. In a trolley system as stated in claim 1 wherein the means carried by each of said lower arm sections comprises a longitudinally extending channel, each of said flexible resilient sealing strips having a beaded edge, the beaded edge being within and laterally restrained by said channel.

3. In an overhead trolley system, the provision of: a preformed virtually rigid elongated housing of inverted U-section adapted to grasp and position a conductor bar, lower sections of arms of said U-shaped housing being oppositely and outwardly inclined to provide an opening therebetween for the reception of a movable collector shoe;
   the edge portion of each of said arms being outwardly enlarged, each said enlargement cooperating with the upper section of an arm to form a groove on the outer side of each arm, said grooves being adapted to receive ends of clamping means for supporting the housing and conductor bar;
   the enlarged edge portion of each of said arms being provided with a longitudinally extending, virtually dove-tailed channel;
   a preformed, ribbon-like, flexible, resilient and removable sealing strip extending from each channel, each sealing strip having a free longitudinal edge and a beaded edge, the beaded edge being within and laterally restrained by a channel;

the free edges of said strips being in sealing relation with each other to cover the opening of said housing, said sealing strips being removable from said channels and housing without dismantling of the trolley system.

4. In a trolley system as stated in claim 1 wherein said flexible and resilient sealing strip free edge portions overlap.

References Cited
UNITED STATES PATENTS

| | | | |
|---|---|---|---|
| 2,668,199 | 2/1954 | Connell | 191—25 |
| 2,961,499 | 11/1960 | Mageoch | 191—23 |
| 3,311,715 | 3/1967 | Corl | 191—30 |

ARTHUR L. LA POINT, *Primary Examiner.*

D. F. WORTH, *Assistant Examiner.*